(12) United States Patent
  Toman

(10) Patent No.: US 9,283,840 B2
(45) Date of Patent: Mar. 15, 2016

(54) HOLLOW OUTPUT SHAFT CORNER FLOTATION DRIVE

(71) Applicant: Valmont Industries, Inc., Omaha, NE (US)

(72) Inventor: Benjamin Toman, Omaha, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 0 days.

(21) Appl. No.: 14/525,616

(22) Filed: Oct. 28, 2014

(65) Prior Publication Data

US 2015/0115695 A1    Apr. 30, 2015

Related U.S. Application Data

(60) Provisional application No. 61/898,443, filed on Oct. 31, 2013.

(51) Int. Cl.
  *B60K 1/00* (2006.01)
  *B60K 7/00* (2006.01)

(52) U.S. Cl.
  CPC ....................................... *B60K 7/00* (2013.01)

(58) Field of Classification Search
  CPC ...................................... B60K 1/00; B60K 7/00
  USPC ........................................................... 73/472
  See application file for complete search history.

(56) References Cited

U.S. PATENT DOCUMENTS

| | | | |
|---|---|---|---|
| 7,159,677 B1* | 1/2007 | Lam | B60K 7/0007 180/65.51 |
| 9,066,475 B1* | 6/2015 | Toman | A01G 25/092 |
| 2010/0127103 A1* | 5/2010 | Toman | A01G 25/092 239/726 |

* cited by examiner

*Primary Examiner* — Lisa Caputo
*Assistant Examiner* — Jamel Williams
(74) *Attorney, Agent, or Firm* — David H. Milligan

(57) ABSTRACT

The present invention discloses a hollow output shaft for a corner system that allows flotation and traction in difficult field conditions to reduce wheel rutting. According to a preferred embodiment, a system is provided which includes a rectangular tube leg, a gearbox, a substantially square tube extension member, a gear motor, a fully keyed shaft and a pair of hub units.

6 Claims, 3 Drawing Sheets

Underside View

Underside View

HOLLOW OUTPUT SHAFT CORNER FLOTATION DRIVE

RELATED APPLICATIONS

The present application claims priority to U.S. Provisional Application No. 61/898,443 filed Oct. 31, 2013.

FIELD OF INVENTION

Technical Field of the Disclosure

The present invention is related to the field of drive systems and, more particularly, to an improved flotation drive unit for a corner pivot irrigation system.

BACKGROUND OF THE INVENTION

Conventional irrigation systems include a corner pivot irrigation system, a center pivot irrigation system or a linear move irrigation system. These irrigation systems include a series of interconnected irrigator spans having conduits for conveying fluid to an agricultural field. Such irrigation systems typically include a water delivery pipeline which is supported by a plurality of structural steel towers or drive units. The steel towers or drive units provide support to the main water supply pipe above the ground and drive the irrigation system over the field to be irrigated. Each of the steel towers or drive units has a pair of spaced apart drive wheels which are driven by any convenient means (i.e. an electric or gas motor) which is connected to a gearbox at each end of the main beam of the towers or drive units. The towers or drive units usually have at least two wheel/tire assemblies which contact the ground and support a substantial percentage of the total weight of the system. The gearbox therefore experiences a significant overhung load due to the cantilevered arrangement of the wheel/tire assembly. This arrangement has considerable drawbacks. First, as these irrigation systems move through a field, the drive wheels on the steel towers create wheel tracks or ruts down into the field. In addition to creating wheel tracks and ruts that extend downwardly into the ground, the conventional drive wheels also cause soil to be displaced to either side of the wheel track. When the field is subsequently prepared for seeding or the like, the tracks, ruts and displaced soil subject the farm machinery to undue stress.

One example of an existing system for minimizing soil disturbance involves the use of a flotation drive wheel in which a hub portion is directly attached to an associated gearbox of the conventional drive tower. In this system, a metal band or plate is welded to the outer periphery of the hub portion of the wheel with a plurality of pivotal flotation shoes being attached to the band or plate. The pivotal shoes include structure for preventing soil from being pushed laterally of the flotation wheel and from being pushed forwardly from the drive wheel. This system, however, is cumbersome and extended use and maintenance is difficult due to its complex structure.

Another existing system discloses an irrigation system with a corner irrigator span which includes a main irrigation portion having an end irrigator span. In this system, a control system controls the movement of the corner irrigator span. Further, the control system includes a linear movement control system to control a corner drive unit of the corner irrigator span and a steering control system that controls a steering unit of the corner irrigator span. A disadvantage of this system is that wheel tracks/wheel ruts are still formed and the system has difficulty moving through heavy mud and difficult terrain in the field.

A further existing system provides a flotation drive assembly for mechanized irrigation systems in which the flotation drive assembly improves upon the field traction of the mechanized agricultural irrigational systems and which reduces rutting. However, this system has a complex structure and the wheel/tire assemblies at the opposite ends of the main frame of the drive unit or tower do not distribute the steering load centrally. Accordingly, this system results in accelerated wear and reduced life of the steering component of the drive assembly.

Based on the foregoing, there is a need for a flotation drive system which would allow additional flotation and traction in difficult field conditions.

SUMMARY OF THE DISCLOSURE

To minimize the limitations found in the prior art, and to minimize other limitations that will be apparent upon the reading of the specifications, the preferred embodiment of the present invention provides a hollow output shaft for a corner system that allows additional flotation and traction in difficult field conditions and reduce wheel rutting in the field.

The present invention discloses an improved flotation drive system which includes a rectangular tube leg, a gearbox, a substantially square tube extension member, a gear motor, a fully keyed shaft and a pair of hub units. The rectangular tube leg is oriented vertically having an upper flange and a lower flange. The upper flange is connected to an upper female tubular structure of the existing corner system. The gearbox includes a top surface, a bottom surface, a pair of opposite front surfaces, a pair of opposite side surfaces and a hollow bore is attached to the lower flange of the rectangular tube leg. The square tube extension member is oriented horizontally with the rectangular tube leg. The gear motor having a drive shaft is coupled to transmit the torque to the gear box. The drive shaft is housed inside the square tube extension member with a removable lower cover. The gear motor is connected to the square tube extension member with the drive shaft extending there through. The fully keyed shaft is inserted into the hollow bore of the gear box. Each of the pair of hub units includes a tubular spacer, a removable tapered female hub assembly, a tapered male bushing, a mounting flange and a plurality of connecting means (i.e. screws, bolts, nuts, fasteners, pins, rings, clips and the like) to connect a wheel of the existing corner system to the hub unit. The wheel/tire assembly is connected to each pair of the hub unit by means of the mounting flange and the plurality of connecting means.

In accordance with one embodiment of the present invention, the tapered geometry of the hub unit lock the shaft axially and radially thereby transmitting the torque and vertical ground reactions in addition to the thrust loads into the gear box. The tapered geometry of the hub unit locks the shaft axially relative to the bore of the gearbox.

In accordance with another embodiment of the present invention, the improved flotation drive system has a shaft protrusion on each of the pair of opposite front surfaces of the gear box which allows additional flotation and reduces the creation of wheel ruts.

In accordance with yet another exemplary embodiment of the present invention, when dual wheel/tire assemblies are utilized, one on each shaft protrusion of the gearbox, the steering load is always centered about the steering axis on each leg without the need for a specialized structure or wider leg assembly. This vastly reduces torque steering, and other load conditions which can result in accelerated wear and reduced life of the steering components on the corner system. It also eliminates the need for larger or wider structures to accommodate larger tires or wider track systems. Multiple wheel/tire assemblies can be mounted on a shaft protrusion having sufficient length. Other exemplary embodiments provide an improved flotation drive system that could have increased ability to push through heavy mud and thereby minimize the wear of the components.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
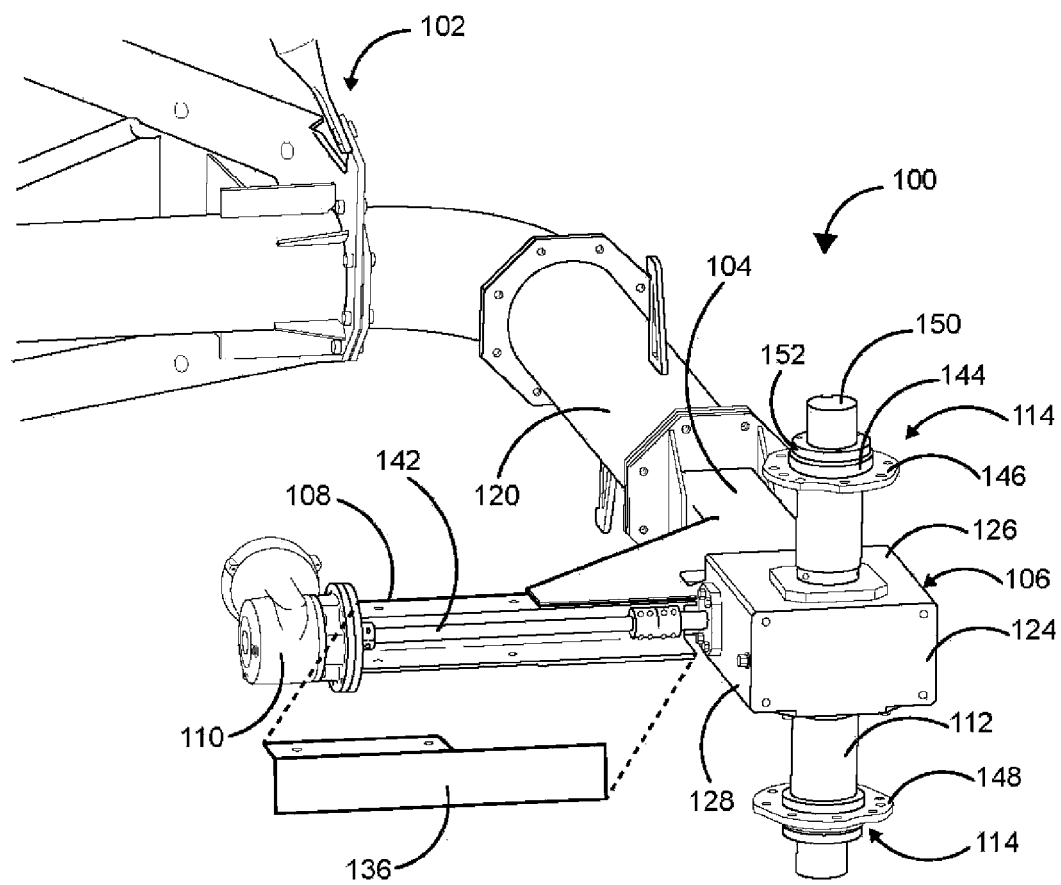
FIG. 1 is a perspective view of the underside of an improved flotation drive system in accordance with a preferred embodiment of the present invention.
Figure 2:
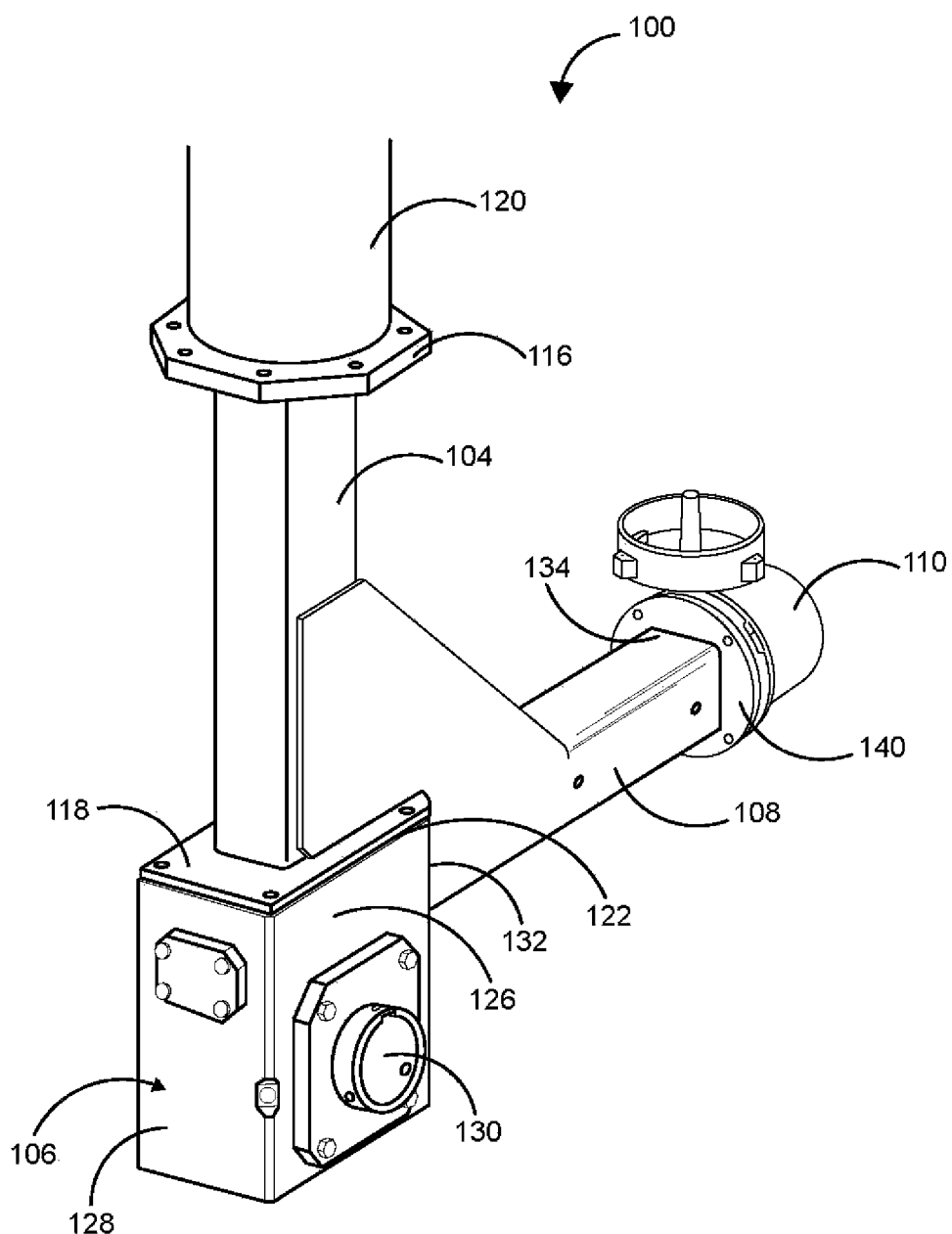
FIG. 2 is a perspective view of a preferred embodiment of an improved flotation drive system of the present invention.

Referring now to FIGS. 1 and 2, an exemplary embodiment of the present invention will now be discussed. With respect to the figures, FIG. 1 is a perspective view from the underside of the present invention and FIG. 2 is a perspective view of the drive system 100 in its normal orientation.

As shown in both FIGS. 1 and 2, an improved flotation drive system 100 for use in conjunction with an existing corner system 102 of the present invention is illustrated. The improved flotation drive system 100 is designed to be installed on each leg of an existing corner system 102. Each leg of an existing corner system may have a male tubular structure (not shown) or a female tubular structure 120. For illustration, the improved flotation drive system 100 is shown connected to the female tubular structure 120.

As detailed in FIGS. 1 and 2, an exemplary improved flotation drive system 100 of the present invention preferably includes: a rectangular tube leg 104, a gearbox 106, a substantially square tube extension member 108, a gear motor 110, a fully keyed shaft 150 and a pair of hub units 114. The rectangular tube leg 104 is oriented vertically having an upper flange 116 and a lower flange 118. The upper flange 116 is connected to an upper female tubular structure 120 of the existing corner system 102. The gearbox 106 includes a top surface 122, a bottom surface 124, a pair of opposite front surfaces 126, a pair of opposite side surfaces 128 and a hollow bore 130 extending between the pair of opposite front surfaces 126 at the center. The top surface 122 of the gearbox 106 is attached to the lower flange 118 of the rectangular tube leg 104. The substantially square tube extension member 108 with a first end 132 and a second end 134 having a removable lower cover 136, a flange 140 on the second end 134. The gear motor 110 having a drive shaft 142 is coupled to transmit the torque to the gear box 106. The drive shaft 142 is housed inside the square tube extension member 108 with the removable lower cover 136 which acts as a guard around the drive shaft 142 and protects users during operation. The gear motor 110 is connected to the flange 140 of the square tube extension member 108 with the drive shaft 142 extending therethrough. The fully keyed shaft 150 is preferably inserted into the hollow bore 130 of the gear box 106 attaching hub units 114 to each of the pair of opposite front surfaces 126 of the gear box 106. Each hub unit 114 includes a tubular spacer 112, a removable tapered female hub assembly 144, a tapered male bushing 152, a mounting flange 146 and a plurality of connecting means 148 to connect a wheel of the existing corner system 102 to the hub units 114. The tapered geometry of the hub units 114 locks the keyed shaft 150 axially and radially thereby transmitting the torque and vertical ground reactions in addition to the thrust loads into the gear box 106. The tapered geometry of the hub unit 114 locks the keyed shaft 150 axially relative to the hollow bore 130 of the gearbox 106. The wheel/tire assembly is connected to the hub units 114 by means of the mounting flange 146 and the plurality of connecting means 148. Multiple wheel/tire assemblies can be mounted on the hub units 114 having sufficient length of keyed shaft 150 and number of hub units 114. The wheel/tire assembly can be mounted relatively close together on either side of the gearbox 106 thereby maximizing the floatation effects of the two wheel/tire contact patches. This is in part due to the narrow geometry of both the gearbox 106 and the flotation drive system 100 with a rectangular tube 104. This reduces the wheel track rutting in the field which occurs under normal operation and thus reduce the reaction loads being transmitted back up into the system 100 in general.

Figure 3:
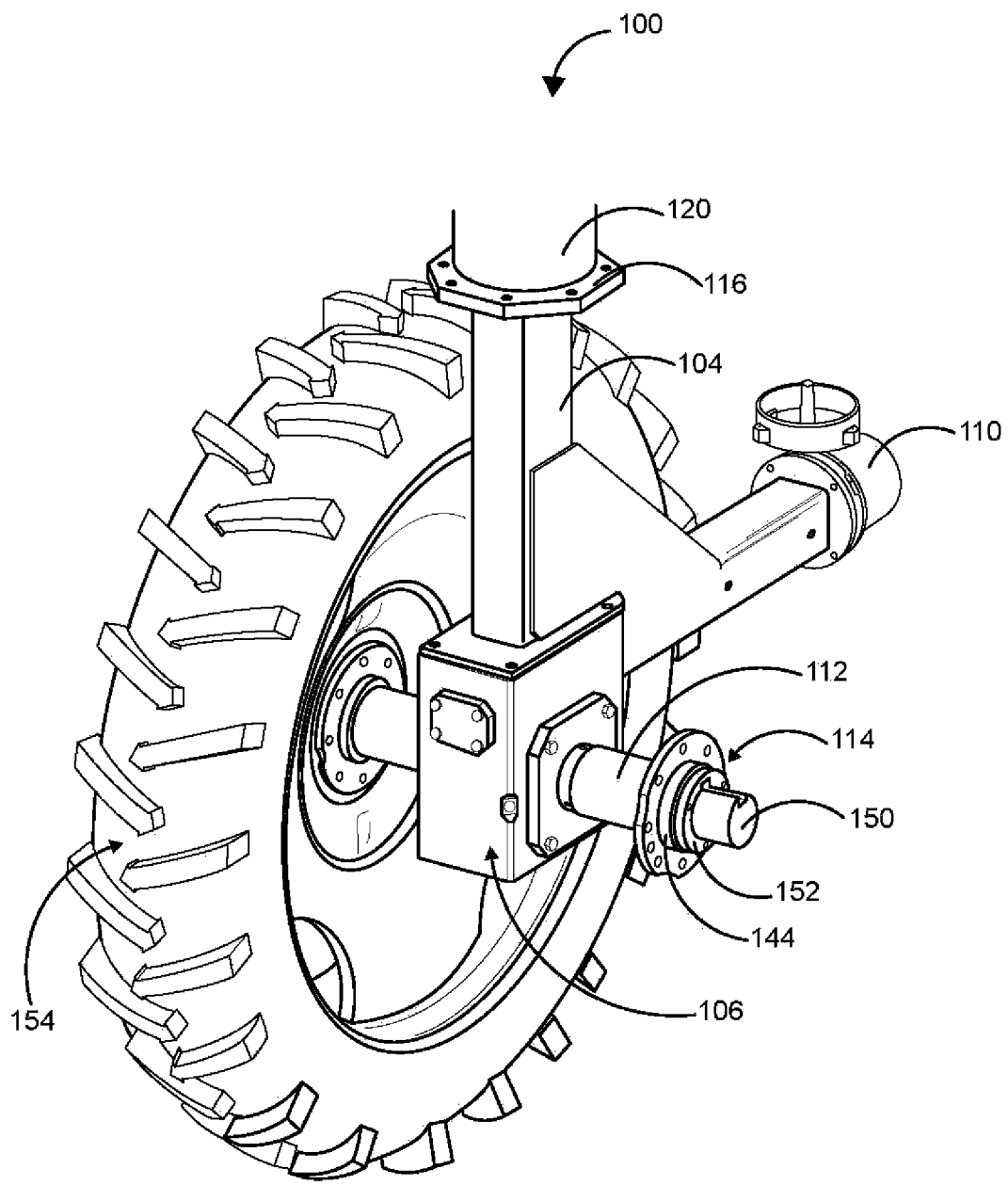
FIG. 3 is a perspective view of a preferred embodiment of an improved flotation drive system of the present invention attached to a wheel/tire assembly of an existing corner system.

FIG. 3 illustrates a perspective view of a preferred embodiment of an improved flotation drive system 100 attached to a wheel/tire assembly 154 of an existing corner system 102. The improved flotation drive system 100 has the fully keyed shaft 150 inserted into the hollow bore 130 of the gear box 106 having hub units 114 on each of the pair of opposite front surfaces 126 of the gear box 106. The hub units 114 has the mounting flange 146 and the plurality of connecting means 148 which allows the wheel/tire assembly 154 to be mounted on each of the hub units 114. The tapered geometry of the hub units 114 locks the keyed shaft 150 axially and radially thereby transmitting the torque and vertical ground reactions in addition to the thrust loads into the gear box 106. The present invention 110 thus improves the traction of the existing corner system 102 and increases the ability to push through heavy mud and other difficult conditions. A single wheel/tire assembly 154 is mounted on each of the hub units 114. Multiple wheel/tire assemblies 154 can be mounted on the hub units 114 with sufficient length of the keyed shaft 150 and number of hub units 114. The present invention results in less downtime and field maintenance at the end of the season.

The improved flotation drive system 100 has the gearbox 106 having the hollow bore 130 at the center of the pair of opposite front surfaces 126. If dual wheel/tire assemblies 154 are utilized, one on each hub unit 114 of the gearbox 106, the steering load is always centered about the steering axis on each leg without the need for a specialized structure or wider leg assembly. This vastly reduces torque steering, and other load conditions which can result in accelerated wear and reduced life of the steering components on the corner system. It also eliminates the need for larger or wider structures to accommodate larger tires or wider track systems. As the load on the improved flotation drive system 100 is not cantilevered, much wider wheel/tire 154 combinations can be accommodated. Multiple wheel/tire assemblies on either side of the gearbox 106 are also possible using an enlarged and/or lengthened keyed shaft 150. Since the keyed shaft 150 is not welded with the gear box 106, it can handle much larger bending moments. The improved flotation drive system 100 is simple in construction and cheaply available.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An improved flotation drive system for use in conjunction with an existing corner system, the flotation drive system comprising:
    a tube leg having an upper flange and a lower flange, the upper flange being adapted to connect to an existing corner system;
    a gearbox having a top surface, a bottom surface, a pair of opposite front surfaces, a pair of opposite side surfaces and a hollow bore extending between the pair of opposite front surfaces at the center, the gearbox being mounted to the lower flange of the tube leg;
    a tube extension member with a first end and a second end, wherein the tube extension member further comprises a flange attached to the second end of the tube extension member;
    a gear motor having a drive shaft coupled to transmit the torque to the gear box, the drive shaft being housed inside the tube extension member, the gear motor being connected to the flange of the tube extension member; and
    a fully keyed shaft being inserted into the hollow bore of the gear box, wherein the fully keyed shaft extends through the gear box so that the keyed shaft protrudes through each of the pair of opposite front surfaces of the gear box.

2. The flotation drive system of claim 1, wherein the tub leg is substantially rectangular.

3. The flotation drive system of claim 2, wherein the tub leg is oriented vertically.

4. The flotation drive system of claim 3, wherein the tub extension member is substantially square.

5. The flotation drive system of claim 4, wherein the tube extension member further comprises a removable lower cover.

6. The flotation drive system of claim 5, wherein the flotation drive system further comprises a pair of hub units each having a tubular spacer, a removable tapered female hub assembly, a tapered male bushing, a mounting flange and a plurality of connecting means to connect a wheel to each hub unit.

* * * * *